UNITED STATES PATENT OFFICE.

ALEXANDER S. RAMAGE, OF DETROIT, MICHIGAN.

METHOD OF MAKING LEAD PIGMENTS.

No. 870,316.

Specification of Letters Patent.

Patented Nov. 5, 1907.

Application filed May 15, 1907. Serial No. 373,715.

*To all whom it may concern:*

Be it known that I, ALEXANDER S. RAMAGE, a citizen of the United States, residing at Detroit, in the county of Wayne and State of Michigan, have invented certain new and useful Improvements in the Method of Making Lead Pigments, of which the following is a specification.

This invention relates to the manufacture of pigments and consists in converting lead sulfate, and particularly the material containing lead sulfate and sulfuric acid which constitutes a byproduct of the manufacture of sulfuric acid by the chamber process, into marketable lead pigments.

According to the invention the lead sulfate is first converted into a basic carbonate, from which pure solutions adapted for the preparation of other pigments, and particularly chrome pigments, may be prepared; or the basic carbonate may be otherwise utilized as desired. The acid constituents of the byproduct above mentioned and hereinafter referred to as chamber sulfate are utilized in the process. The invention will be described by reference to the treatment of such chamber sulfate, but it will be understood that it is applicable to the treatment of lead sulfate from other sources by supplying the necessary sulfuric acid.

My preferred procedure is substantially as follows: A suitable quantity, as for instance one ton, of the chamber sulfate, containing as a rule some ten percent of free sulfuric acid, is agitated with water in a suitable tank provided with a brass stirring device and suitable heating means, and is then allowed to settle and the clear liquid decanted, this treatment being preferably repeated several times until the free acid is completely removed. This treatment applies only to the initial batch of sulfate as will appear hereafter. The washed sulfate is then treated with a solution containing for each pound of metallic lead contained in the sulfate at least 0.26 pounds of sodium hydroxid and 0.175 pounds of sodium carbonate, and the whole is boiled for about fifteen minutes. The sulfate of lead is completely converted into basic lead carbonate having the approximate formula $Pb\ CO_3.2Pb\ H_2O_2$, while the solution contains sodium sulfate, sodium carbonate and some lead. The contents of the tank are then filtered, and the basic carbonate washed with water until freed from sulfates. The alkaline filtrate is run into another tank containing about one ton of chamber sulfate which has not been washed to free it from acid. This free sulfuric acid reacts with the sodium carbonate of the solution rendering the solution acid. In case the chamber sulfate does not contain sufficient free acid to render the solution distinctly acid to litmus paper, further portions of chamber sulfate or of sulfuric acid are added until this condition is attained. The lead held in solution will then be completely precipitated, as lead sulfate is substantially insoluble in a strong saline solution having an acid reaction. The solution, containing only sodium sulfate, together with impurities and a trace of sulfuric acid is then separated from the lead sulfate, and treated as hereinafter described. The sulfate of lead in the tank, being substantially neutral, is then treated without further washing with a solution of sodium hydroxid and carbonate under conditions substantially as above described for the production of further quantities of the basic carbonate. The alkaline solution derived from this second batch of basic carbonate is available for neutralizing further portions of the chamber sulfate.

The slightly acid solution above described, consisting chiefly of sodium sulfate is treated in a suitable tank with a small amount of chlorid of lime to oxidize the impurities, is then neutralized with sodium carbonate, boiled, filtered, and then cooled to about 30 degrees F. Sodium sulfate crystallizes out on standing, and may be separated by means of a hydro-extractor and dried in the usual way to produce anhydrous sodium sulfate.

For the preparation of chrome pigments the basic carbonate of lead is dissolved in sufficient acetic acid to yield neutral lead acetate, the solution occurring without undue frothing as is the case when normal carbonate is dissolved. The resulting lead acetate solution always contains a small quantity of iron in the ferrous state, and also traces of copper, more particularly when pyrite has been used for the production of the sulfuric acid in the chambers from which the sulfate has been obtained.

It is very important that all traces of iron or copper should be removed from the solution before utilizing the same for the preparation of chrome pigments, as such pigments are rendered muddy by iron and are given a brownish tint by even minute traces of copper. This purification is readily effected as follows: The neutral acetate solution is boiled and a small amount of a soluble bichromate, preferably sodium bichromate, is added, this serving the double purpose of precipitating the copper together with a little lead as chromate, and of oxidizing the iron to the ferric state. Thereupon sufficient basic carbonate of lead or other suitable lead compound is added to convert the neutral acetate of lead into the basic salt, and the resulting solution is boiled, whereupon the iron separates completely as basic ferric acetate. The solution is then clarified by filtration or decantation, and is utilized for the preparation of chrome pigments in any usual or preferred manner. This method of purification is also applicable to nitrate solutions, should it be desired to use these as a basis for the preparation of the chrome pigments.

I claim:

1. The method which consists in reacting on lead sulfate with an alkali metal carbonate and hydroxid to produce basic lead carbonate, bringing the resulting solution into contact with chamber sulfate, thereby acidifying said solution and eliminating lead therefrom and abstracting acid from said chamber sulfate, converting said sulfate into basic carbonate of lead, dissolving the basic carbonate in an acid solvent, purifying the solution, and preparing a chrome pigment therefrom.

2. The method which consists in reacting on lead sulfate with an alkali metal carbonate and hydroxid to produce basic lead carbonate, bringing the resulting solution into contact with chamber sulfate, thereby acidifying said solution and eliminating lead therefrom and abstracting acid from said chamber sulfate, converting said sulfate into basic carbonate of lead, dissolving the basic carbonate in acetic acid, purifying the solution and rendering it basic by the successive addition of a bichromate and a compound of lead, and preparing a chrome pigment from the purified solution.

3. The method of preparing chrome pigments which consists in dissolving impure basic carbonate of lead in an acid solvent, purifying the solution and rendering it basic and preparing a chrome pigment from the basic solution.

4. The method of preparing chrome pigments which consists in dissolving impure basic carbonate of lead in an acid solvent, adding an oxidizing agent, rendering the solution basic, and preparing a chrome pigment from the basic solution.

5. The method of preparing chrome pigments which consists in dissolving impure basic carbonate of lead in acetic acid, purifying the solution and rendering it basic by the successive addition of a bichromate and a compound of lead, and preparing a chrome pigment from the purified solution.

In testimony whereof, I affix my signature in presence of two witnesses.

ALEXANDER S. RAMAGE.

Witnesses:
EUGENE A. BYRNES,
CLINTON P. TOWNSEND.